United States Patent

Goldberg

[11] 3,768,861
[45] Oct. 30, 1973

[54] TWO-POSITION CHILD'S SEATING SYSTEM

[76] Inventor: Morris I. Goldberg, 39 Locke Rd., Newton, Mass. 02168

[22] Filed: Apr. 10, 1972

[21] Appl. No.: 242,615

[52] U.S. Cl. .............................. 297/253, 297/355
[51] Int. Cl. ............................................ A47d 1/10
[58] Field of Search .................. 297/253, 250, 256, 297/255, 254, 355

[56] References Cited
UNITED STATES PATENTS

| | | |
|---|---|---|
| 3,170,727 | 2/1965 | Peterson ............................ 297/253 |
| 3,583,761 | 6/1971 | Hume ................................. 297/253 |
| 3,669,492 | 6/1972 | Peterson ............................ 297/253 |
| 3,572,827 | 3/1971 | Merelis .............................. 297/253 |
| 3,305,265 | 2/1967 | Linden ............................... 297/253 |

*Primary Examiner*—Francis K. Zugel
*Attorney*—Robert E. Meyer

[57] ABSTRACT

A child's seating system useful both as an infant's automobile seat and as an auxiliary infant's seat on any flat surface wherein means are provided to adjust said seat between an upright position and a reclining position.

2 Claims, 5 Drawing Figures

Patented Oct. 30, 1973
3,768,861
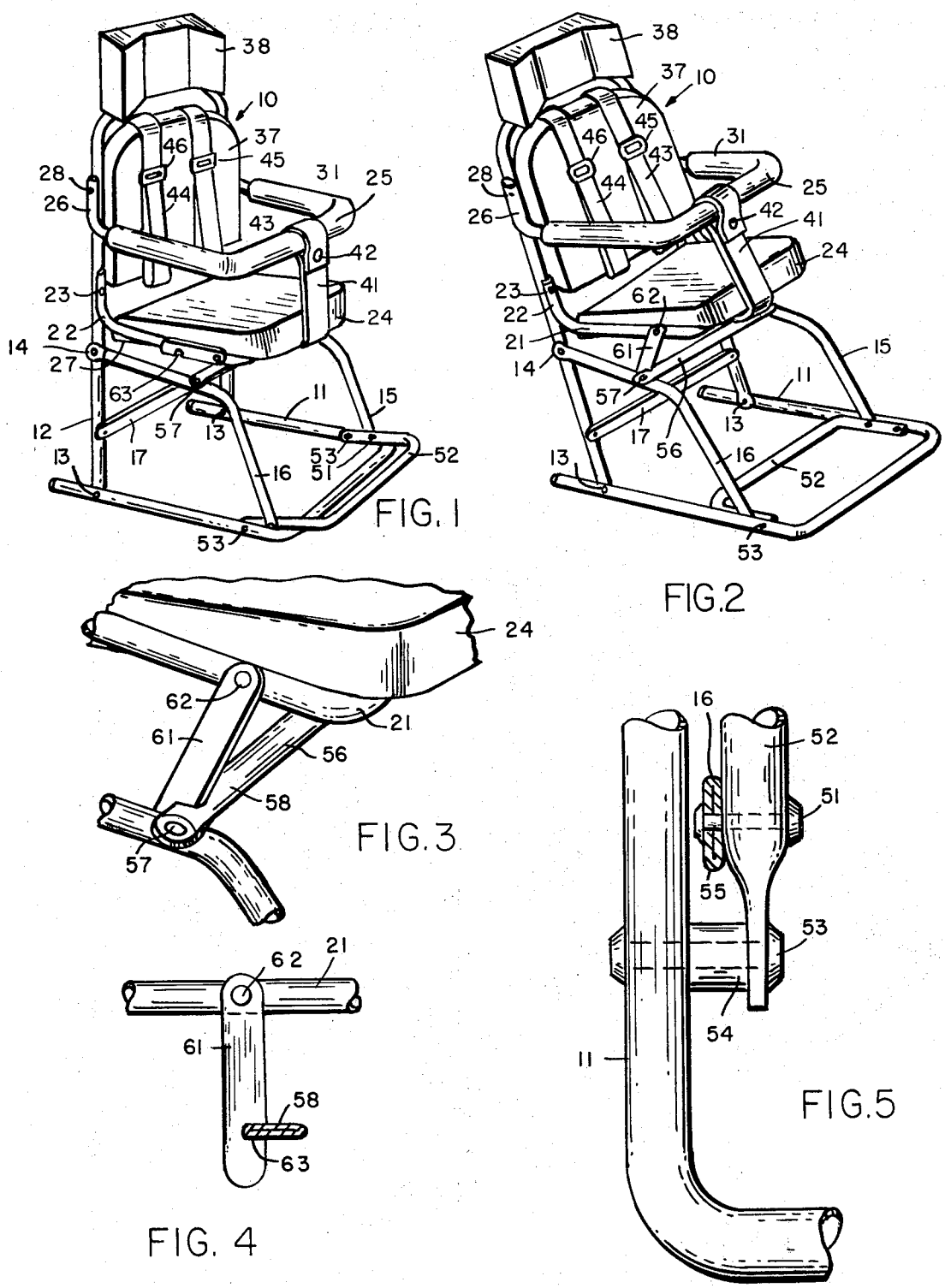

TWO-POSITION CHILD'S SEATING SYSTEM

BRIEF SUMMARY OF THE INVENTION

This invention relates to infant's furniture and more particularly to a child's seating system that is adjustable between two positions—an upright position and a reclining position.

It is customary to provide an auxiliary seat for very small children for use in automobiles and elsewhere. Typically such seats are used from the time when the child can sit up comfortably until such time as the child is tall enough and old enough to sit comfortably on a regular seat. For use as an automobile seat such seats are designed to rest on the regular seat to raise the child high enough so that he may look out of the window and to be secured to the frame of the automobile through interaction with the standard seat (lap) belt.

A typical such infant's seat is provided with a tubular metal frame normally about five-eighths in. in diameter having a base member designed to rest on an automobile seat or any suitable flat surface with a rearward extension designed to pass into the crack between the bottom and the back of an automobile seat, and a back portion designed to rest against the back of the automobile seat.

Such a seat is typically provided with a seat cushion, a back cushion, a head rest, shoulder straps attached to the back portion, passing over the back cushion with loops at the lower end adapted to receive the standard auto seat belt, and a padded guard rail adapted to swing between a horizontal position surrounding the child and a raised position over and behind the child's head to permit the easy passage of the child into and out of the seat.

A crotch strap is normally provided with one end attached to the frame beneath the seat cushion and the other end detachably connected to the guard rail, passing between the child's legs when the child is sitting in the seat to prevent the child from raising the guard rail, or when the child is very small, from slipping out through the space between the guard rail and the seat cushion. While such seats are particularly designed for use in automobiles, they are also designed to stand on any flat surface and are therefore useful as auxiliary infant's seats anywhere such seating is desired. Of course, away from the automobile, since there is no seat belt, the shoulder belts become inoperative.

A very small child when he dozes while sitting up tends to slump forward. When the seat is used in an automobile such slumping is prevented by the shoulder straps. However, as pointed out above, the shoulder straps are not available for use when the seat is used as an auxiliary infant's seat away from an automobile.

Since the angle between the plane of the seat cushion and the plane of the back cushion in a typical automobile seat is fairly close to perpendicular, even though the seat as a whole may be tipped somewhat backwards, the angle between the base member and the back portion of an infant's car seat when such seat is used as an automobile seat, must be pretty close to perpendicular also. It is the object of this invention to provide means whereby the angle between the base portion and the back portion of the infant's seat can be changed easily from substantially perpendicular when the seat is used as an automobile seat, to an obtuse angle when the seat is used as an auxiliary infant's seat. When standing on a flat surface the seat will be substantially upright in the first position and will recline sufficiently to keep the child from slumping over when dozing when in the second position.

BRIEF DESCRIPTION OF THE DRAWINGS

FIG. 1 is a perspective view of a child's seat of the present invention in its upright position;

FIG. 2 is a similar view as FIG. 1 but with the child's seat of the present invention in the reclining position;

FIG. 3 is a detail of FIG. 2 showing the locking clip in locked position;

FIG. 4 is an elevation partially in section showing the locking clip of FIG. 3; and FIG. 5 is a plan view partially in section showing details of the locking brace.

DETAILED DESCRIPTION

A typical infant's car seat indicated generally at 10 is shown in FIGS. 1 and 2. Seat 10 comprises a generally U-shaped bottom frame member 11 and an upstanding generally U-shaped back frame member 12, both formed of suitable lightweight metal tubing, and pivotally joined as by rivets 13. Preferably frame 12 is joined to frame 11 at an intermediate position so that there is an extended portion of frame 11 adapted to slide into the crack between the bottom cushion and the back cushion of an automobile seat. A pair of curved tubular brace members 15 and 16 are provided between an intermediate position on frame 12 to which they are pivotally mounted as indicated at 14, and a position near the closed forward end of frame 11. A cross brace 17 is provided between the two arms of frame 12, intermediate the intersection with brace members 15 and 16 and the intersection with frame 11 to strengthen and stabilize the structure. A U-shaped seat cushion support member 21 is provided to extend substantially perpendicularly to back frame member 12 from the forward side of back frame member 12 to which it is attached as by rivets 23 extending through upturned end portions 22 provided for this purpose with the ends of portions 22 flattened and curved to conform to tubular back frame member 12. Seat cushion 24 is supported on the front portion of support member 21 and on a cross-bar 27, arranged at an intermediate position between the side arms of support member 21.

Guard rail 25 is a generally U-shaped member similar in shape but with slightly greater length and width dimensions than support member 21 having upturned end portions 26 pivotally mounted to the sides of back frame 12 as indicated at 28. Guard rail 25 is typically covered with padding as indicated at 31. The guard rail 25 is adapted to rotate about pivots 28 between a raised position that extends over and behind back frame member 12 and a lower position where it extends substantially parallel to seat support member 21 by the contact of the back of upturned end portions 26 with a flat cross-bar member (not shown) mounted behind frame 12.

Back cushion 37 is mounted between the sides of back frame 12 on the aforesaid cross-bar and on a second cross-bar (also not shown) mounted on rivets 23 which hold seat support member 21. A head rest 38 is provided mounted at the upper end of back frame 12. Crotch strap 41 is attached at one end to the cross-bar supporting seat cushion 24 and passes under the front portion of seat support portion 21 up and over padded guard rail 25 where it is detachably fastened to itself by snap fastener 42, the two portions of which are provided at a spaced interval in crotch strap 41. Shoulder straps 43 and 44 are provided passing from the upper cross-bar behind the back cushion 37, up and over the top of back cushion 37, down the front of back cushion 37, returning to length-adjusting buckles 45 and 46 forming a loop on each of shoulder straps 43 and 44 adapted to receive an automobile seat belt.

The forward ends of brace members 15 and 16 are flattened as indicated at 55 and are pivotally mounted as by rivet 51 to an intermediate portion on the opposing side arms of generally U-shaped locking brace 52. U-shaped locking brace 52 in turn is pivotally mounted between the sides of U-shaped bottom frame member 11 at a position adjacent the forward cross-member of bottom frame 11 by means of rivets 53 passing through apertures provided in frame 11 and in the flattened end portion of locking brace 52 for that purpose. A spacer 54 is provided surrounding each rivet 53 between frame member 51 and locking brace 52 to provide the necessary clearance between the parts.

The several parts are so proportioned that when locking brace 52 is in its forward position overlying the cross-member of bottom frame member 11 as shown in FIG. 1, back frame 12 is substantially perpendicular to bottom frame 11. When seat 10 is in this position the bottom of seat support member 21 rests on a horizontal support member 56 provided between brace members 15 and 16 and attached thereto by rivets 57. Conveniently horizontal member 56 is formed of tubular stock with its ends flattened as indicated at 58.

Alternatively locking brace 52 can be rotated about pivots 53 to a rearward position as shown in FIG. 2 wherein it lies entirely within bottom frame member 11. This action moves the forward ends of brace members 15 and 16 rearwardly relative to the forward end of bottom frame 11. Since the rear ends of brace members 15 and 16 are pivotally attached at pivots 14 to rear frame 12, this movement of brace members 15 and 16 causes rear frame 12 to rotate about pivots 13 relative to bottom frame member 11 causing the seat 10 to recline. The degree of reclining is controlled by the spacing between pivots 51 and pivots 53. In a typical such seat a space of about 1 inch between the axis of pivot 51 and the axis of pivot 53 causes about a 15° movement of frame 12 relative to frame 11.

Since seat cushion support member 21 is rigidly attached to back frame 12 and since horizontal support member 56 is attached between brace members 15 and 16, the movement of frame 12 relative to frame 11 when locking brace 52 is moved from its forward position to its rearward position lifts seat support member 21 away from horizontal support member 56. To provide proper support for support member 21 when seat 10 is in its reclining position, a pair of locking clips 61 are provided pivotally attached to the outside of the side portions of seat support member 21 by rivets 62. Locking clips 61 are conveniently formed of flat stock and are provided on the forward edge with a groove 63 adapted to engage the flattened portions 58 of horizontal support member 56 as shown in FIGS. 3 and 4. When not in use locking clips 61 can be stored parallel to the sides of said support member 21 as shown in FIG. 1.

I claim:

1. In a child's seating system of the type having a bottom frame member including two parallel spaced arms adapted to rest on a seat cushion or on a flat surface;
   a rear frame member including two parallel spaced arms pivotally mounted at one end to said bottom frame member, said rear frame member being provided with a forwardly extending seat support member;
   and a pair of brace members extending between an intermediate portion of said bottom frame member and an intermediate portion of said rear frame member, one on each side to maintain said rear frame member at a fixed position relative to said bottom frame member;
   means for varying the angle of said rear frame member relative to said bottom frame member, comprising a generally U-shaped locking brace having arms pivotally mounted adjacent the ends thereof to said parallel spaced arms of said bottom frame member, the ends of said brace members adjacent said bottom frame member being pivotally mounted to an intermediate portion of said arms of said locking brace;
   wherein when said locking brace is in a forward position relative to said bottom frame member, the rear frame member is maintained in a position substantially perpendicular to said bottom frame member, and when said locking brace is in a rearward position relative to said bottom frame member the seat is in a reclined position.

2. In a child's seating system of the type having a bottom frame member including two parallel spaced arms adapted to rest on a seat cushion or on a flat surface;
   a rear frame member including two parallel spaced arms pivotally mounted at one end to said bottom frame member, said rear frame member being provided with a forwardly extending seat support member;
   and a pair of brace members extending between an intermediate portion of said bottom frame member and an intermediate portion of said rear frame member, one on each side to maintain said rear frame member at a fixed position relative to said bottom frame member;
   means for varying the angle of said rear frame member relative to said bottom frame member, comprising a generally U-shaped locking brace having arms pivotally mounted adjacent the ends thereof to said parallel spaced arms of said bottom frame member, the ends of said brace members adjacent said bottom frame member being pivotally mounted to an intermediate portion of said arms of said locking brace;
   wherein a horizontal support member is provided mounted on said brace members adapted to support said seat support member when said locking brace is in the forward position and wherein a pair of locking clips are provided pivotally attached one to each side of said seat support member, each said locking clip being provided with a slot adapted to engage said horizontal support member when said locking brace is in the rearward position relative to said bottom frame member.

* * * * *